US007986886B2

United States Patent
Park et al.

(10) Patent No.: US 7,986,886 B2
(45) Date of Patent: Jul. 26, 2011

(54) OPTICAL SIGNAL DETECTOR

(75) Inventors: Chan Yong Park, Gwangju-si (KR); Gap Youl Lyu, Irvine, CA (US); Kil Hun Koo, Northridge, CA (US); Min Hee Kang, Irvine, CA (US)

(73) Assignee: Wooriro Optical Telecom Co., Ltd., Gwangju (KR)

( * ) Notice: Subject to any disclaimer, the term of this patent is extended or adjusted under 35 U.S.C. 154(b) by 566 days.

(21) Appl. No.: 12/179,851

(22) Filed: Jul. 25, 2008

(65) Prior Publication Data

US 2009/0175623 A1 Jul. 9, 2009

(30) Foreign Application Priority Data

Jul. 27, 2007 (KR) .................. 10-2007-0075905

(51) Int. Cl.
*H04B 10/08* (2006.01)
*H04B 10/06* (2006.01)

(52) U.S. Cl. ................... 398/210; 398/33; 398/202

(58) Field of Classification Search ............. 398/25, 398/33, 158, 202, 208
See application file for complete search history.

(56) References Cited

U.S. PATENT DOCUMENTS

| 5,099,114 A * | 3/1992 | Matsumoto et al. ..... 250/227.23 |
| 6,151,150 A * | 11/2000 | Kikuchi ..................... 398/209 |
| 7,546,038 B2 * | 6/2009 | Wang et al. ................. 398/118 |

* cited by examiner

*Primary Examiner* — Dalzid Singh
(74) *Attorney, Agent, or Firm* — Drinker Biddle & Reath LLP

(57) ABSTRACT

An optical signal detector is provided that detects an optical signal from an optical source using a plurality of optical sensors having different wavelength selectivities, thereby determining the peak wavelength of the optical signal and measuring the power of an optical signal corresponding to the peak wavelength. According to the optical signal detector, separate optical filters are not required and space and costs attributable to the installation of the optical filters can be saved, and thus there are effects in that the overall size and manufacturing costs of the device can be reduced.

20 Claims, 4 Drawing Sheets

OPTICAL SIGNAL DETECTOR

BACKGROUND

The present invention relates generally to an optical signal detector and, more particularly, to an optical signal detector that detects an optical signal from an optical source using a plurality of optical sensors having different wavelength selectivities, thereby determining the peak wavelength of the optical signal and measuring the power of an optical signal corresponding to the peak wavelength.

In general, in order to monitor wavelength-division-multiplexed multi-channel optical signals, the optical power, optical wavelength and Optical Signal to Noise Ratio (OSNR) of each optical signal channel must be measured.

Recently, with the introduction of Fiber To The Home (FTTH) networks, which are high-speed, high-capacity transmission networks, there is an urgent need for a method that can be easily used for the maintenance of the FTTH networks and that can accurately measure the wavelength and optical power of an optical source.

According to the IEEE standards, currently, FTTH employs signal wavelengths in bands of 1310 nm, 1490 nm and 1550 nm. It is necessary to measure the power of optical signals corresponding to the peak wavelength and other wavelengths of an optical source and maintain the performance of a network in a normal state using measured values at the time of laying optical fiber or repairing/recovering optical fiber in an HTTH network.

FIG. 1 is a block diagram showing a conventional optical signal detector.

As shown in this drawing, a conventional optical signal detector 100 is a device for measuring the wavelength and power of an optical signal incident from an optical source, and includes a primary optical detector 130 for detecting the power of an optical signal incident from an optical source and outputting a corresponding signal, one or more optical filters 111 to 11N (N=1, 2, 3, ... ) for passing only optical signals, corresponding to respective preset transmissive wavelength bands, from the optical source, therethrough, one or more secondary optical detectors 121 to 12N located to correspond to the respective optical filters 111 to 11N and configured to output signals corresponding to respective powers of the optical signal passed through the optical filters 111 to 11N, a signal conversion unit 140 for converting signals, detected by the primary optical detector 130 and the secondary optical detectors 121 to 12N, into a form that can be processed, a wavelength determination unit 150 for determining the peak wavelength of the optical source based on the signals detected by the secondary optical detectors 121 to 12N, and a power measurement unit 160 for measuring the power of the optical signal corresponding to the peak wavelength based on the signal detected by the primary optical detector 130.

However, the conventional optical signal detector has a problem in that the optical filters and the secondary optical detectors are spaced apart from each other, and thus it is difficult to implement stable optical space arrangement therebetween, with the result that it is impossible to accurately measure the wavelength and power of an optical signal. Furthermore, there is a problem in that a complicated Gaussian approximate value must be calculated from discrete measured values. Furthermore, a problem arises in that the costs incurred by and mounting space required by the optical filters are considerable, so that the manufacturing costs thereof are high and the size thereof is large.

SUMMARY

Accordingly, the present invention has been made keeping in mind the above problems occurring in the prior art, and an object of the present invention is to provide an optical signal detector that, without requiring optical filters, can determine the peak wavelength of an optical signal from an optical source and measure the power of an optical signal corresponding to the peak wavelength.

In order to accomplish the above object, various embodiments of the present invention provide an optical signal detector for monitoring an optical source for providing an optical signal in one of a plurality of bands including a first wavelength, a second wavelength or a third wavelength, that is, transmission bands of a wavelength-division-multiplexed optical signal, the optical signal detector including a primary optical sensor for detecting power of an optical signal incident from the optical source; a plurality of secondary optical sensors for detecting respective optical signals corresponding to respective preset bands; a signal conversion unit for converting signals, detected by the primary optical sensor and the secondary optical sensors, into a form that can be processed; a wavelength determination unit for determining a peak wavelength of the optical source based on a number of operating secondary optical sensors among the secondary optical sensors; and a power measurement unit for measuring power of an optical signal corresponding to the peak wavelength based on the signal detected by the primary optical sensor.

In the optical signal detector, the secondary optical sensors include a first secondary optical sensor for detecting an optical signal corresponding to a band of a first wavelength and a second secondary optical sensor for detecting an optical signal corresponding to a band of first and second wavelengths.

Here, the wavelength determination unit determines the first wavelength to be the peak wavelength if all of the first and second secondary optical sensors operate, and determines the second wavelength to be the peak wavelength if only the second secondary optical sensor operates.

In the optical signal detector, the secondary optical sensors include a first secondary optical sensor for detecting an optical signal corresponding to a band of a first wavelength, a second secondary optical sensor for detecting an optical signal corresponding to a band of first and second wavelengths, and a third optical sensor for detecting an optical signal corresponding to a band of first to third wavelengths.

Here, the wavelength determination unit determines the first wavelength to be the peak wavelength if all of the first, second and third secondary optical sensors operate, determines the second wavelength to be the peak wavelength if only the second and third secondary optical sensors operate, and determines the third wavelength to be the peak wavelength if only the third secondary optical sensor operates.

In the optical signal detector according to various embodiments of the present invention, the first wavelength, the second wavelength and the third wavelength have gradually and sequentially increasing lengths.

BRIEF DESCRIPTION OF THE DRAWINGS

The above and other objects, features and other advantages of the present invention will be more clearly understood from the following detailed description taken in conjunction with the accompanying drawings illustrating and describing various embodiments of the invention, in which.

DETAILED DESCRIPTION OF THE PREFERRED EMBODIMENTS

Preferred embodiments of the present invention will be described in detail below with reference to the accompanying drawings.

Figure 1:
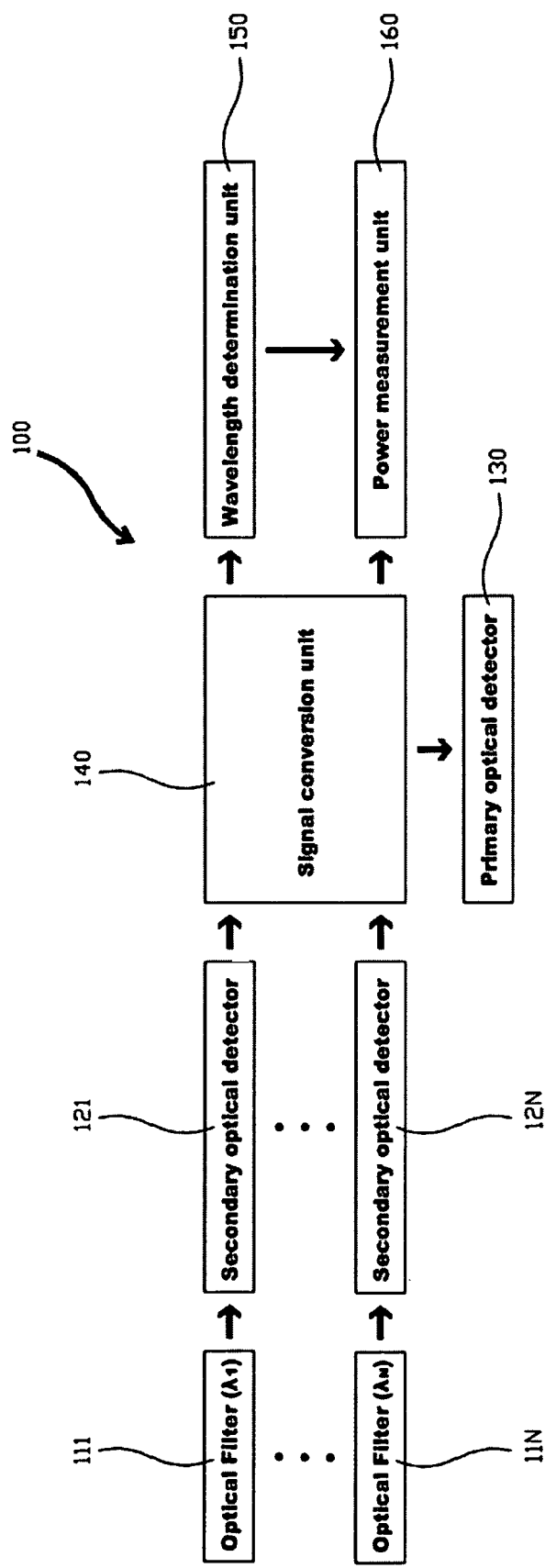
FIG. 1 is a block diagram showing a conventional optical signal detector.
Figure 2:
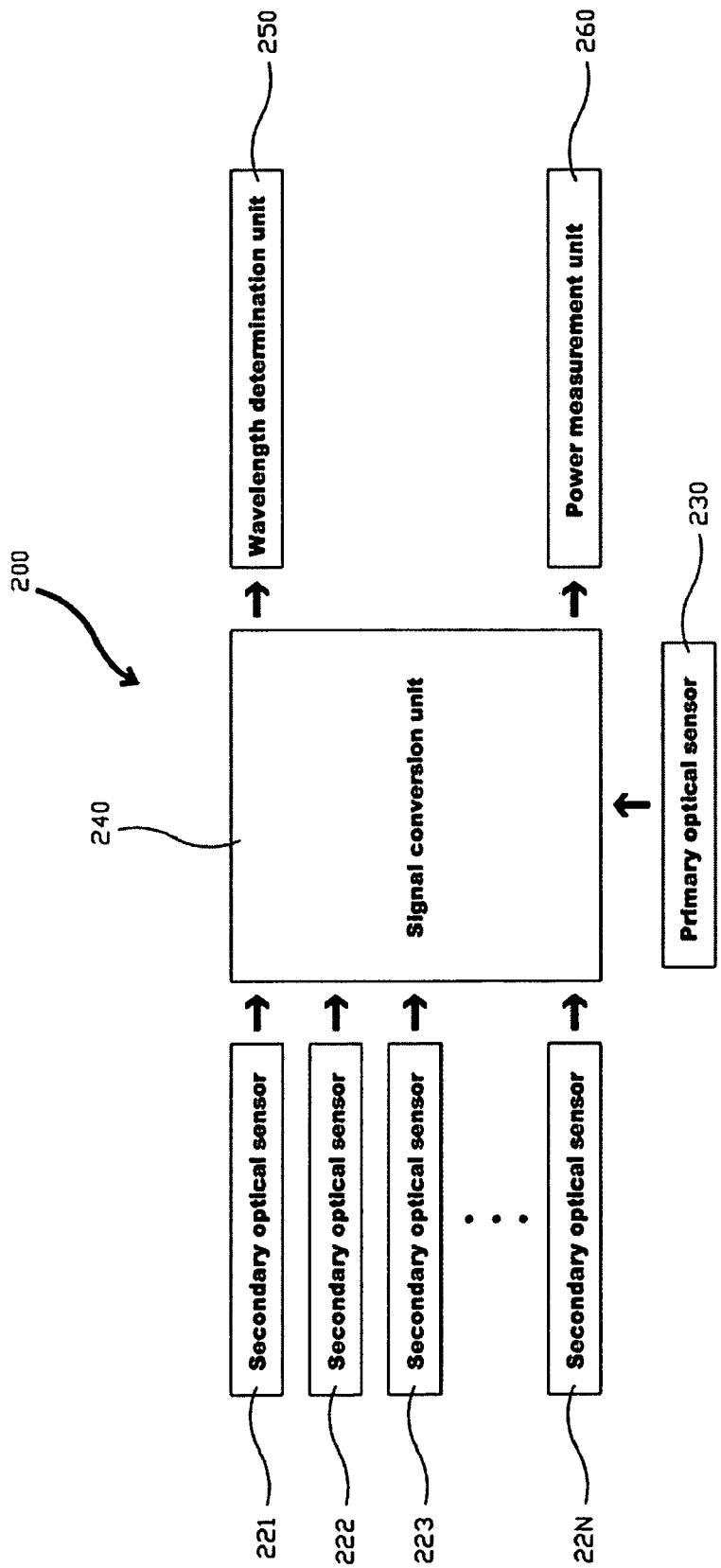
FIG. 2 is a block diagram showing an optical signal detector according to an embodiment of the present invention.

FIG. 2 is a block diagram showing an optical signal detector according to an embodiment of the present invention.

As shown in this drawing, an optical signal detector 200 according to the present invention includes a primary optical sensor 230 for detecting the power of an optical signal incident from an optical source, first to Nth secondary optical sensors 221 to 22N for detecting optical signals, corresponding to respective preset bands, from the optical source, a wavelength determination unit 250 for determining the peak wavelength of the optical source based on the number of operating secondary optical sensors among the first to Nth secondary optical sensors 221 to 22N, and outputting a corresponding signal, and a power measurement unit 260 for measuring the power of the optical signal corresponding to the peak wavelength based on the signal detected by the primary optical sensor 230.

Figure 3:
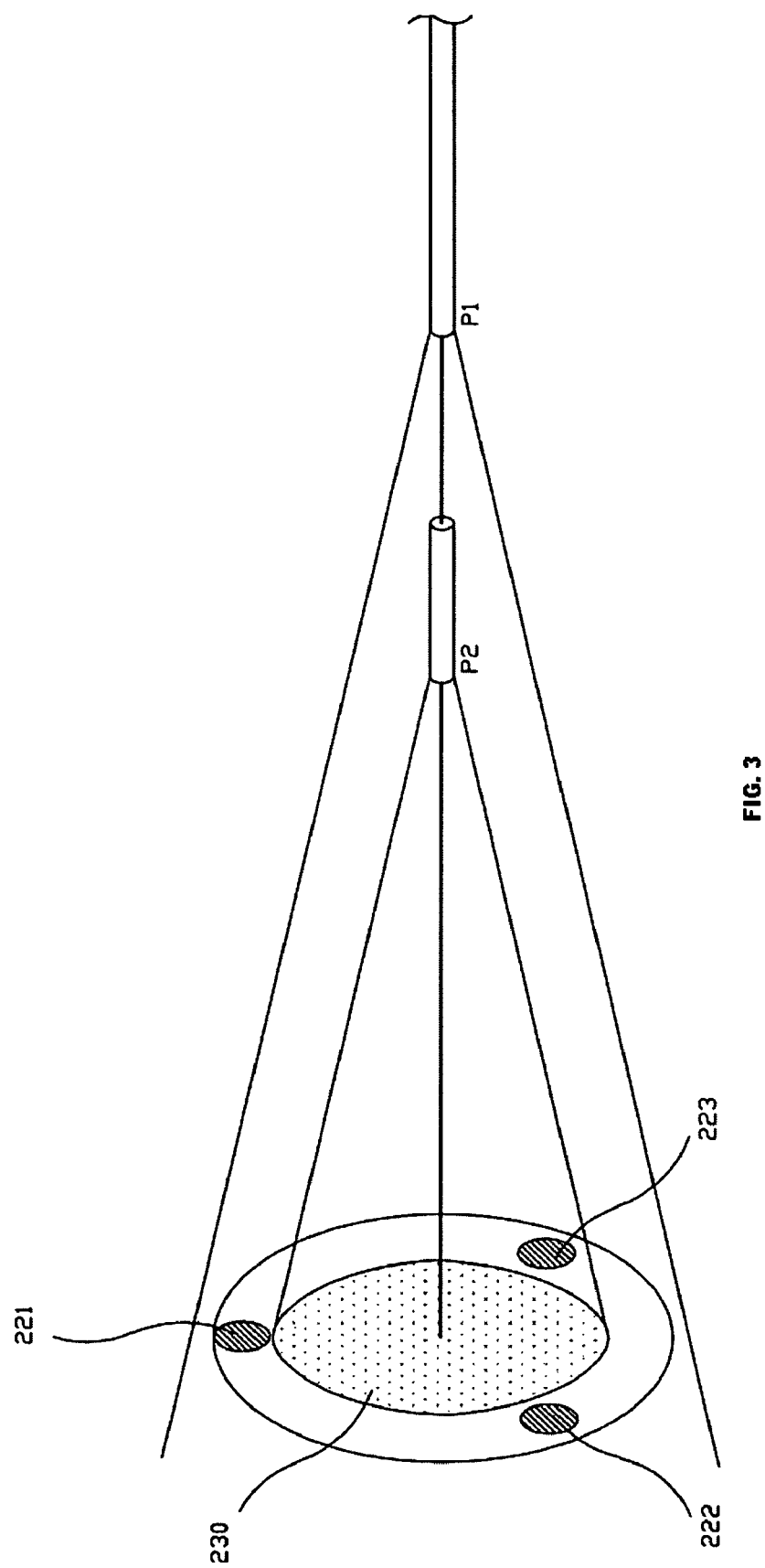
FIG. 3 is a pictorial diagram showing an example of the arrangement of the primary optical sensor and the first to Nth secondary optical sensors shown in FIG. 2.

In this case, the optical source provides an optical signal in one of the first to Nth wavelengths ($\lambda_1$ to $\lambda_N$) bands, which are transmission bands for wavelength-division multiplexed optical signals, and the arrangement of the primary optical sensor 230 and the first to Nth secondary optical sensors 221 to 22N is illustrated in FIGS. 2 and 3 in detail.

Additionally, it is apparent that the optical signal conversion unit 240 converts the signals, detected by the first to Nth secondary optical sensors 221 to 22N, into a form that can be processed in the wavelength determination unit 250. Furthermore, if necessary, a display unit (not shown) for selectively displaying the peak wavelength determined by the wavelength determination unit 250 may be further included.

In the optical signal detector 200 according to the present invention, the primary optical sensor 230 has the characteristic of a wide detection band, and thus it can measure the power of an optical signal, which flows into the optical signal detector and is provided by the optical source, regardless of wavelength.

In the optical signal detector 200 according to various embodiments of the present invention, it should be noted that the first to Nth secondary optical sensors 221 to 22N have partially overlapping dictions, but have selectivity for different wavelengths. Furthermore, the first to Nth secondary optical sensors 221 to 22N are two or more in number.

In this case, an embodiment related to the wavelength selectivity of the first to Nth secondary optical sensors 221 to 22N will be described in detail below in conjunction with FIG. 4.

In the optical signal detector 200 according to the present invention, the signal conversion unit 240 is formed of a photoelectric transducer, such as a photodiode, in which current flows as the first to Nth secondary optical sensors 221 to 22N absorb light, and thus an amplifier for amplifying the current signal of the photodiode and a current-voltage converter for converting the amplified current signal into a voltage signal are included.

Meanwhile, although the current-voltage converter is used as an embodiment of the signal conversion unit 240, the signal conversion unit 240 is not necessarily limited thereto. Furthermore, it is preferred that the signal conversion unit 240 further include an A/D converter for converting an analog signal to a digital one.

In the optical signal detector 200 according to various embodiments of the present invention, the wavelength determination unit 250 is connected to the primary optical sensor 230 and the first to Nth secondary optical sensors 221 to 22N through an input terminal, and may be implemented using a microprocessor.

In the optical signal detector 200 according to various embodiments of the present invention, when a signal, converted into a voltage signal, is input through the signal conversion unit 240, the power measurement unit 260 determines a correction value corresponding to the peak wavelength based on the peak wavelength of the optical source determined by the wavelength determination unit 250 with reference to a lookup table. Furthermore, the signal converted by the signal conversion unit 240 can be corrected by performing a procedure of performing addition or multiplication on the correction value. Thereafter, the finally corrected signal value is determined to be the power of the optical source.

As a result, the power of the optical signal corresponding to the peak wavelength can be accurately measured by automatically determining the peak wavelength of the optical source using the first to Nth secondary optical sensors 221 to 22N and correcting the power of the optical signal, obtained from the primary optical sensor 230, based on the peak wavelength in a process in which the optical source is inserted into and connected to the optical signal detector 200 according to an embodiment of the present invention.

FIG. 3 is a diagram showing an example of the arrangement of the primary optical sensor and the first to Nth secondary optical sensors shown in FIG. 2. Here, N is 3, and the case in which the first to Nth secondary optical sensors 221 to 22N are first to third secondary optical sensors is shown as an example in the drawing.

As shown in this drawing, when an optical source is inserted into the optical signal detector 200 according to the embodiment of the present invention, the optical source is placed at a first location P1 and a second location P2, the first to Nth secondary optical sensors 221 to 22N are disposed to detect one optical signal emitted from the optical source at the first location P1, and the primary optical sensor 230 is placed to detect an optical signal emitted from the optical source at the second location P2.

Here, it can be seen that a first region, across which light that is emitted at the first location P1 and propagates, is wider than a second region, across which light is emitted at the second location P2 and propagates. Accordingly, in the present embodiment of the invention, the size of the primary optical sensor 230 is determined to be a size that enables light incident within the second region P2 to be measured, and the first to Nth secondary optical sensors 221 to 22N are arranged at locations that enable light incident within the first region P1 to be measured. However, in the present invention, the arrangement of the primary optical sensor 230 and the first to Nth secondary optical sensors 221 to 22N is not necessarily limited to the above-described arrangement.

According to this structure, from the time at which the optical source starts to be inserted into the device, the peak wavelength of an optical signal that propagates from the optical source at the first location P1 can be measured. Thereafter, when the optical source has been completely inserted into the device, the power of the optical signal that propagates at the second location P2 can be measured.

The primary optical sensor 230 and the first to Nth secondary optical sensors 221 to 22N output electrical signals corresponding to the power of respective optical signals. Since the structure of the optical sensors is well known in the related field, a detailed description thereof is omitted here.

Figure 4:
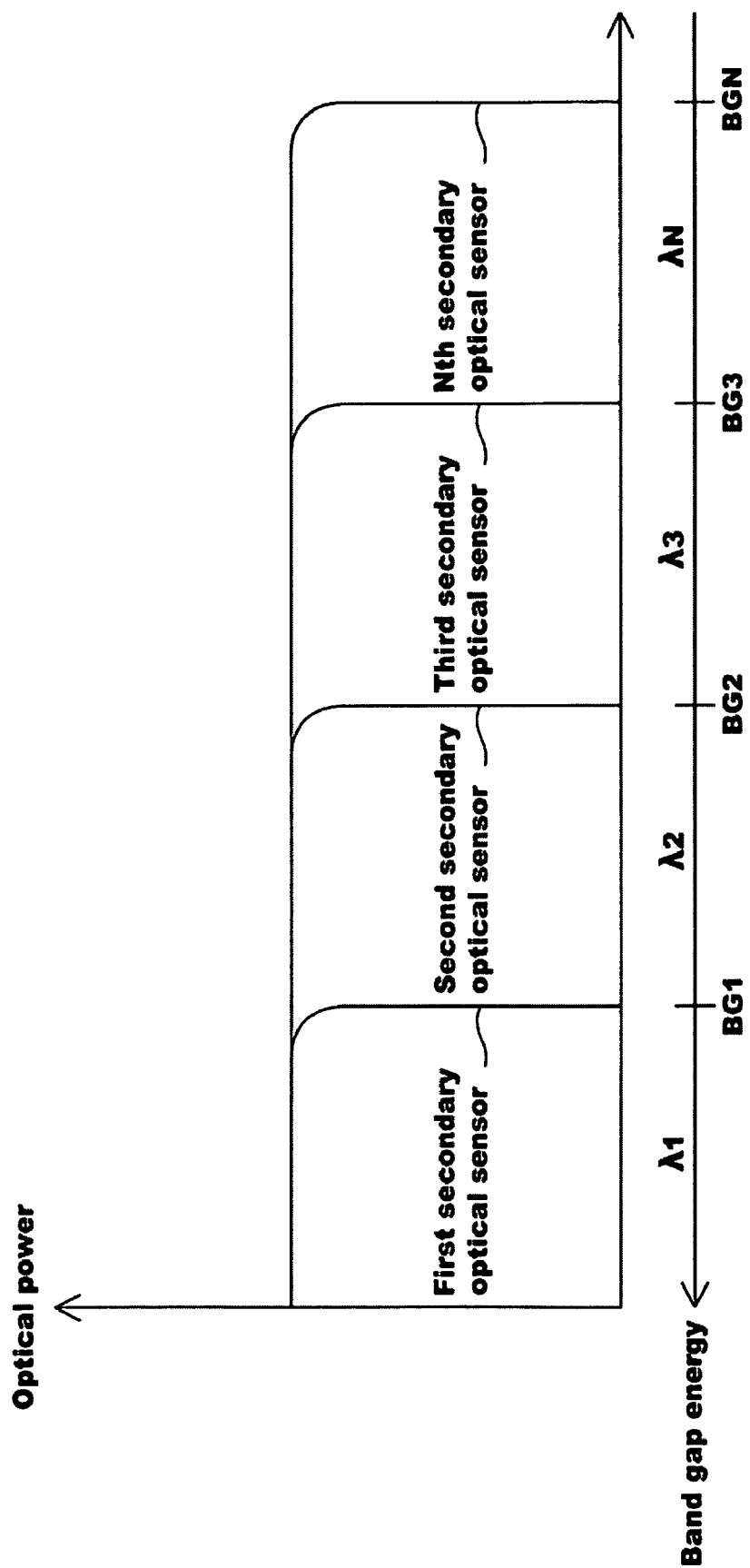
FIG. 4 is a graph showing an example of the wavelength selectivity of the first to Nth secondary optical sensors 221 to 22N shown in FIG. 2.

FIG. 4 is a graph showing an example of the wavelength selectivity of the first to Nth secondary optical sensors 221 to 22N shown in FIG. 2. In this drawing, only the detection bands of the first to Nth secondary optical sensor 221 to 22N have been shown, but the differences in sensitivity attributable to respective wavelengths within each detection band are not considered.

As shown in this drawing, the first secondary optical sensor 221 is configured to detect an optical signal corresponding to the band of a first wavelength $\lambda_1$, the second secondary optical sensor 222 is configured to detect an optical signal corresponding to the band of first and second wavelengths $\lambda_1$ and $\lambda_2$, the third secondary optical sensor 223 is configured to detect an optical signal corresponding to the band of first to third wavelengths $\lambda_1, \lambda_2$, and $\lambda_3, \ldots$, and the Nth secondary optical sensor 22N is configured to detect an optical signal corresponding to the band of the first to Nth wavelengths $\lambda_1$ to $\lambda_N$.

If N is 2, the first to Nth secondary optical sensors 221 to 22N are first and second secondary optical sensors 221 and 222. If N is 3, the first to Nth secondary optical sensors 221 to 22N are first to third secondary optical sensors 221 to 223.

Here, it is preferred that the first to Nth wavelengths $\lambda_1$ to $\lambda_N$ have gradually and sequentially increasing lengths.

In a related embodiment, the first to Nth secondary optical sensors 221 to 22N have respective characteristics related to first to Nth energy band gaps BG1 to BGN, which are minimum energy bands in which the secondary optical sensors can receive and react to light, and the first to Nth energy band gaps BG1 to BGN have gradually and sequentially decreasing widths.

The energy band gaps of the first to third secondary optical sensors in the case in which N is 3 and the first to Nth secondary optical sensors 221 to 22N are first to third secondary optical sensors are described in detail below.

It is preferred that the first optical sensor 221 be formed of a photodiode, in which the first energy band gap BG1 is wider than the second energy band gap BG2 and the third energy band gap BG3 in order to selectively absorb only an optical signal in a band, including the first wavelength $\lambda_1$, but not the second wavelength $\lambda_2$ and the third wavelength $\lambda_3$.

It is preferred that the second optical sensor 222 be formed of a photodiode, in which the second energy band gap BG2 is narrower than the first energy band gap BG1 and is wider than the third energy band gap BG3 in order to selectively absorb only an optical signal in a band, including the first and second wavelength $\lambda_1$ and $\lambda_2$, but not the third wavelength $\lambda_3$.

It is preferred that the third secondary optical sensor 223 be formed of a photodiode, in which the energy band gap BG3 is narrower than the first and second energy band gaps BG1 and BG2, in order to also absorb an optical signal in a band, including the first to third wavelengths $\lambda_1$ to $\lambda_3$.

Meanwhile, since the structures of photodiodes having different energy band gaps applied to the first to third secondary optical sensors 221 to 223 are well known in the related field, a detailed description thereof will be omitted here.

Here, since each optical source provides an optical signal in any of wavelength bands of 1310 nm, 1490 nm and 1550 nm, which are wavelength bands used for an Ethernet-Passive Optical Network (E-PON) or a Gigabit-Passive Optical Network (G-PON), it can be seen that the first wavelength $\lambda_1$ is 1310 nm, the second wavelength $\lambda_2$ is 1490 nm, and the third wavelength $\lambda_3$ is 1550 nm, in the case in which N is 3.

The operation of the optical signal detector according to various embodiments of the present invention, which is constructed as described above, is described below. Here, the following description will be given taking as an example the case in which, in the optical signal detector of the present invention, the first to Nth secondary optical sensors are first to third secondary optical sensors 221 to 223, that is, in which there are three secondary optical sensors.

When an optical source for providing an optical signal in any one of a plurality of wavelengths, including first to third wavelengths $\lambda_1$ to $\lambda_N$, is provided in the optical signal detector 200 according to various embodiments of the present invention, the optical signal provided by the optical source enters the first to third secondary optical sensors 221 to 223. Accordingly, the first to third secondary optical sensors 221 to 223 selectively detect the optical signal depending on respective wavelength bands previously set for the first to third secondary optical sensors 221 to 223, and output corresponding electrical signals (hereinafter referred to as "detected signals").

In greater detail, the wavelength determination unit 250 determines the first wavelength $\lambda_1$ to be the peak wavelength of the optical source if signals detected by all of the first to third secondary optical sensors 221 to 223 are input through the input terminal thereof, determines the second wavelength $\lambda_2$ to be the peak wavelength of the optical source if on signals detected by the second and third secondary optical sensors 222 and 223 are input, and determines the third wavelength $\lambda_2$ to be the peak wavelength of the optical source if only a signal detected by the third secondary optical sensor 223 is input.

Here, the fact that a signal detected by each of the first to third secondary optical sensors 221 to 223 is input means that, when an optical signal having a power exceeding the unique energy band gap of the secondary optical sensor is input, the secondary optical sensor operates and an electrical output signal proportional to the power of the optical signal is input to the wavelength determination unit 250.

Although the preferred embodiments of the present invention have been described above, it will be apparent to those skilled in the art various modifications are possible within a range that does not depart from the scope of the present invention. Accordingly, the range of the rights of the present invention must not be limited to the described embodiments, but must be defined based not only on the following claims but also on equivalents thereof.

The optical signal detector according to the present invention can measure the wavelength and power of an optical signal provided from an optical source without requiring separate optical filters, and enables space and costs attributable to the installation of the optical filters to be saved, and thus there are effects in that the overall size and manufacturing costs of the device can be reduced, with the consequence that it is expected that the device can be applied to a plurality of apparatuses that use optical communication.

As described above, the optical signal detector according to various embodiments of the present invention detects the wavelength band of an optical signal, provided by a light source, and then determines the peak wavelength of the wavelength band, using a plurality of optical sensors having partially overlapping wavelength bands and different wavelength selectivities, and measures the power of an optical signal corresponding to the peak wavelength based on a signal detected by the primary optical sensor for receiving an optical signal having a broadband wavelength. As a result, the wavelength and power of an optical signal provided from an optical source can be measured without requiring the installation of separate optical filters, and space and costs attributable to the installation of the optical filters can be saved, and thus there are effects in that the overall size and manufacturing costs of the device can be reduced, with the result that it is expected that the device can be applied to a plurality of apparatuses using optical communication.

A detector processor may also incorporate a memory for storing program data and executing it, a permanent storage device, a communications port for handling communications with external devices, and user interface devices, including a display, keyboard, mouse, etc. When software modules are involved, these software modules may be stored as program instructions executable on the processor on media such as tape, CD-ROM, etc., where this media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An optical signal detector for monitoring an optical source that provides an optical signal in at least one of a plurality of bands that is transmission bands of a wavelength-division-multiplexed optical signal, the optical signal detector comprising:
   a primary optical sensor for detecting power of an optical signal incident from the optical source;
   a plurality of secondary optical sensors for detecting respective optical signals corresponding to respective preset bands;
   a signal conversion unit for converting signals, detected by the primary optical sensor and the secondary optical sensors, into a processable form;
   a wavelength determination unit for determining a peak wavelength of the optical source based on a number of operating secondary optical sensors among the secondary optical sensors;
   a power measurement unit for measuring power of an optical signal corresponding to the peak wavelength based on the signal detected by the primary optical sensor; and
   an output at which at least one of the peak wavelength and the measured power corresponding to the peak wavelength is provided.

2. The optical signal detector as set forth in claim 1, wherein the secondary optical sensors comprise a first secondary optical sensor for detecting an optical signal corresponding to a band of a first wavelength and a second secondary optical sensor for detecting an optical signal corresponding to a band of first and second wavelengths.

3. The optical signal detector as set forth in claim 2, wherein the wavelength determination unit determines the first wavelength to be the peak wavelength if all of the first and second secondary optical sensors operate, and determines the second wavelength to be the peak wavelength if only the second secondary optical sensor operates.

4. The optical signal detector as set forth in claim 1, wherein the secondary optical sensors comprise a first secondary optical sensor for detecting an optical signal corresponding to a band of a first wavelength, a second secondary optical sensor for detecting an optical signal corresponding to a band of first and second wavelengths, and a third optical sensor for detecting an optical signal corresponding to a band of first to third wavelengths.

5. The optical signal detector as set forth in claim 4, wherein the wavelength determination unit determines the first wavelength to be the peak wavelength if all of the first, second and third secondary optical sensors operate, determines the second wavelength to be the peak wavelength if only the second and third secondary optical sensors operate, and determines the third wavelength to be the peak wavelength if only the third secondary optical sensor operates.

6. The optical signal detector as set forth in claim 1, wherein the first wavelength, the second wavelength and the third wavelength have gradually and sequentially increasing lengths.

7. The optical signal detector as set forth in claim 1, wherein the primary optical sensor is located in a central region of the optical signal detector, and the secondary optical sensors are located on a peripheral region of the optical signal detector.

8. The optical signal detector as set forth in claim 1, wherein:
   the optical signal emitted from a first location falls on a first region that is larger than a second region one which an optical signal falls that is emitted from a second location;
   the primary optical sensor is of a size that enables light incident within the second region to be measured; and the secondary optical sensors are arranged at locations that enable light incident within the first region to be measured.

9. The optical signal detector as set forth in claim 1, wherein the secondary optical sensors have partially overlapping ranges of sensitivity.

10. The optical signal detector as set forth in claim 1, wherein the signal conversion unit comprises a photoelectric transducer.

11. The optical signal detector as set forth in claim 10, wherein the photoelectric transducer is a photodiode.

12. The optical signal detector as set forth in claim 11, wherein the signal conversion unit is an amplifier that amplifies a current signal of the photodiode in which current flows as the second optical sensors absorb light.

13. The optical signal detector as set forth in claim 12, wherein the signal conversion unit comprises an A/D converter.

14. The optical signal detector as set forth in claim 1, wherein the wavelength determination unit comprises an input terminal via which the primary optical sensor and the secondary optical sensors are connected.

15. The optical signal detector as set forth in claim 14, wherein the wavelength determination unit comprises a microprocessor.

16. The optical signal detector as set forth in claim 1, further comprising a lookup table via which the wavelength determination unit determines a peak wavelength.

17. The optical signal detector as set forth in claim 1, wherein the optical signal wavelengths include 1310 nm, 1490 nm, and 1550 nm.

18. A method for providing an output from an optical signal detector, comprising:
   providing an optical signal from an optical source;
   receiving the optical signal by a primary optical sensor and a plurality of secondary optical sensors;
   converting the received optical signals into a processable form;
   determining a peak wavelength of the optical source based on a number of operating secondary optical sensors from among the secondary optical sensors;
   measuring power of an optical signal corresponding to the peak wavelength of the optical signal; and
   outputting at least one of the peak wavelength and the measured power corresponding to the peak wavelength.

19. The method according to claim 18, wherein determining the peak wavelength comprises:
   determining a first wavelength to be the peak wavelength if the optical signal is detected by all of the secondary optical sensors; and
   determining a second wavelength to be the peak wavelength if the optical signal is detected by all but one of the secondary optical sensors.

20. The method according to claim 18, further comprising correcting a power value at the determined peak wavelength.

\* \* \* \* \*